United States Patent [19]
Sturges

[11] Patent Number: 5,854,637
[45] Date of Patent: *Dec. 29, 1998

[54] METHOD AND APPARATUS FOR MANAGING ACCESS TO A COMPUTER SYSTEM MEMORY SHARED BY A GRAPHICS CONTROLLER AND A MEMORY CONTROLLER

[75] Inventor: Jay J. Sturges, Orangevale, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 515,672

[22] Filed: Aug. 17, 1995

[51] Int. Cl.$^6$ .................................................. G06F 15/167
[52] U.S. Cl. ............................................ 345/512; 345/521
[58] Field of Search ..................... 395/501, 502, 395/512, 521, 522, 412; 345/501, 502, 512, 513, 521, 522, 526

[56] References Cited

U.S. PATENT DOCUMENTS

| | | | |
|---|---|---|---|
| 4,945,499 | 7/1990 | Asari et al. ............................. | 345/522 |
| 4,959,803 | 9/1990 | Kiyohara et al. ....................... | 345/340 |
| 5,088,024 | 2/1992 | Vernon et al. .......................... | 395/291 |
| 5,274,774 | 12/1993 | Manber et al. ......................... | 395/305 |
| 5,301,272 | 4/1994 | Atkins ..................................... | 395/516 |
| 5,319,388 | 6/1994 | Mattison et al. ....................... | 405/290 |
| 5,335,322 | 8/1994 | Mattison ................................. | 345/511 |
| 5,450,542 | 9/1995 | Lehman et al. ....................... | 3945/512 |
| 5,507,026 | 4/1996 | Fukushima et al. ................... | 395/507 |
| 5,546,587 | 8/1996 | Silver ..................................... | 395/730 |
| 5,553,248 | 9/1996 | Melo et al. ............................. | 395/296 |

*Primary Examiner*—Raymond J. Bayerl
*Assistant Examiner*—Cao H. Nguyen
*Attorney, Agent, or Firm*—Blakely, Sokoloff, Taylor & Zafman LLP

[57] ABSTRACT

A computer system having a shared memory accessible by a memory controller and a graphics controller is described. A portion of the shared memory is selectively defined as a frame buffer. Graphics operations provided by a client device are routed through the memory controller if a frame buffer is created. If no frame buffer is created, the graphics commands are routed through the graphics controller.

17 Claims, 6 Drawing Sheets

METHOD AND APPARATUS FOR MANAGING ACCESS TO A COMPUTER SYSTEM MEMORY SHARED BY A GRAPHICS CONTROLLER AND A MEMORY CONTROLLER

BACKGROUND OF THE INVENTION

1. Field of the Invention

The invention generally relates to computer systems and, in particular, to computer systems employing a memory controller and a graphics controller.

2. Related Applications

The present application is related to U.S. patent application Ser. No. 08/516,496, entitled, "Method and Apparatus for Arbitrating Access to a Shared Computer System Memory by a Graphics Controller and a Memory Controller," filed Aug. 17, 1995, which application is assigned to the assignee of the present application, and is herein incorporated.

3. Description of Related Art

Typical computer systems employing a microprocessor utilize a memory controller and a graphics controller. The memory controller controls access by the microprocessor and other peripheral integrated circuits (IC) to system memory. The graphics controller controls display of data provided by the microprocessor onto a display screen using a frame buffer. Both the system memory and the frame buffer are typically implemented using arrays of dynamic random access memory (DRAM) chips. In such systems, the memory controller and microprocessor cannot directly access the frame buffer, and the graphics controller cannot directly access the system memory.

Certain disadvantages arise from providing a frame buffer which is separate from system memory. For example, if all or a portion of a frame buffer is not in use, it would be desirable to allow unused portions of the frame buffer memory to be employed as system memory. This cannot easily be achieved with a separate frame buffer controlled by a graphics controller.

One proposed solution to the foregoing problem is to provide a single array of DRAM memory chips accessible through a single interface bus by both the memory controller and the graphics controller. The memory space provided by the single array is partitioned between system memory and frame buffer memory. In such a system, the memory controller may access the frame buffer portion of memory for use as system memory. Also, certain graphics operations may be expedited by allowing both the graphics controller and the memory controller to write graphics data into the frame buffer. For example, a set of individual graphics operations may be pipelined with some operations performed through the graphics controller and others through the memory controller in rapid succession. Another advantage of such a system is that the size of the portion of memory devoted to the frame buffer may be easily modified based upon the needs of the system.

Hence, in such a system, both the memory controller and the graphics controller can access the same array of physical memory through a single interface bus. An arbitration mechanism must be employed to prevent conflicts between the memory controller and the graphics controller. An appropriate arbitration mechanism is set forth in the above-referenced copending patent application. A management system should also be employed to control access to the shared memory by software running on the microprocessor including operating system software and applications software. For example, operating system software must be prevented from corrupting the frame buffer portion of the shared memory while that portion of the shared memory is being used as a frame buffer by the graphics controller. Such corruption could occur if, for example, operating system software swaps data into or out of the frame buffer portion of the shared memory. On the other hand, to gain the benefit of having additional system memory when a frame buffer is not required, application software should be able to access all portions of the shared memory.

The foregoing software access issues are particularly problematic in systems employing paging, such as systems employing a microprocessor configured in accordance with Intel Architecture. Page tables must be defined and accessed in such a manner that corruption of data contained within the frame buffer does not occur. Software access issues are also particularly problematic in systems employing caches wherein a portion of data contained within the frame buffer may be cached, for example, within an L1 cache within the microprocessor or within an L2 cache connected to the memory controller, or within both. In such systems, cache coherency must be maintained. Accordingly, it would be desirable to provide a method and apparatus for controlling software access to a shared computer system memory, particularly for a system employing caching and paging, and aspects of the present invention are drawn to such a method and apparatus.

As noted above, one of the advantages of providing a shared computer system memory is that graphics operations within the frame buffer portion of the memory may be performed directly by the microprocessor through the memory controller, rather than through the graphics controller. However, circumstances may arise where the memory controller may be busy performing needed memory operations, such as DRAM refresh operations, and graphics commands issued by the microprocessor therefore cannot be performed immediately through the memory controller. In systems where memory operations can be buffered between the microprocessor and the memory controller, perhaps in a FIFO buffer, circumstances may arise where the buffer becomes full, possibly resulting in a stall of the microprocessor. Accordingly, it would be desirable to provide an improved method and apparatus for expediting the execution of graphics operations generated by the microprocessor within a system employing a shared memory. Further aspects of the invention are drawn to such an improved method and apparatus.

In systems employing microprocessors capable of performing sophisticated graphics operations, such as those normally performed by graphics controller, it would be desirable to implement a shared computer memory system which allows the microprocessor to perform almost all computer graphics operations. Others aspects of the invention are drawn to such an implementation.

Another problem with implementing a shared computer system memory accessible through only a single interface bus is that access to the memory by the memory controller must be frequently blocked to allow the graphics controller to perform frame buffer refresh operations. In a typical proposed implementation, such frame buffer refresh operations must be performed fairly frequently. Accordingly, considerable bus bandwidth must be devoted to handling frame buffer refresh operations. Accordingly, it would be desirable to provide an improved method and apparatus for partitioning the system memory and the frame buffer memory within the shared memory to minimize the impact on total bus bandwidth by frame buffer refresh operations. Other aspects of the invention are drawn to such an improved partitioning.

SUMMARY OF THE INVENTION

A method and apparatus for managing access to a shared computer system memory accessible by both a memory controller and a graphics controller through a single interface bus is provided. In accordance with one aspect of the invention, the computer system is configured to selectively define a portion of the shared memory as a frame buffer. Graphics commands and data provided a microprocessor or other client device are routed through the memory controller if a frame buffer is created. Otherwise, graphics commands and data are routed through the graphics controller.

In one embodiment, the shared memory is partitioned between a system memory portion and a frame buffer memory portion with the frame buffer defined within a predetermined top-most portion of the physical memory. For example, in an eight megabyte memory system, the frame buffer may be defined as residing within the top one megabyte of the memory. At system start-up, a BIOS transmits a signal to an operating system of the microprocessor identifying the top of system memory as being the bottom of the frame buffer portion of memory. Accordingly, thereafter, operating system memory commands access only the system memory portion of the shared memory. Access to the frame buffer portion of the memory by the microprocessor or other client devices is provided through a virtual frame buffer device (VFBD) which recognizes the frame buffer portion of memory. Graphics operations, such as commands or data, generated by software operating on the microprocessor are intercepted by the VFBD which routes the commands or data through the memory controller to the frame buffer. The graphics controller also has access to the frame buffer portion of the shared memory. An arbitration mechanism, described in the above-referenced patent application, may be employed for arbitrating competing access requests to the shared memory from the memory controller and the graphics controller.

The graphics controller is connected through a PCI bus to any of the variety of peripheral device bus masters or other clients which may provide graphics operations targeting the frame buffer. The PCI bus is also connected to the memory controller and to the host CPU. To ensure that all accesses to the frame buffer through the memory controller are first processed by the VFBD, the memory controller is configured to ignore any memory commands accessing the frame buffer memory received directly from the PCI bus. All graphics operations targeting the frame buffer provided along the PCI bus are therefore routed through the graphics controller to the shared memory.

In an exemplary implementation, the microprocessor is configured in accordance with Intel Architecture and a virtual memory management (VMM) is provided for handling paging of portions of the shared memory. At system start-up, the VMM sets up paging tables relating addresses of the system memory portion of the shared memory to virtual memory addresses. Accordingly, page tables are not initially defined for the frame buffer portion of shared memory. However, once an application program requires access to a frame buffer, the VFBD controls the VMM to set up paging tables for the frame buffer portion of the shared memory. The page tables of the frame buffer are logically distinct from the page tables of the system memory. Operating system software recognizes only the page tables associated with system memory. When the frame buffer is no longer required, the frame buffer is closed and memory devoted to frame buffer page tables is made available for other purposes.

Also in the exemplary embodiment, an L1 cache is provided on the microprocessor and an L2 cache is provided connected to the memory controller. Cache coherency is maintained as follows. Data from the frame buffer portion of the shared memory is not cached in the L1 cache of the microprocessor. Otherwise, all accesses to the frame buffer by the graphics controller would require a snoop of the L1 cache. Moreover, if the L1 cache is a write back cache, the microprocessor must perform a flush operation after performing any accesses to the frame buffer memory. Likewise, if the L2 cache is a write back cache, the memory controller must perform a flush operation after completion of any access to the frame buffer.

As noted above, in the exemplary embodiment, all graphics operations provided by software running on the microprocessor are routed through the VFBD to the memory controller. The memory controller is provided with a FIFO buffer for buffering such commands. If the FIFO buffer becomes full, graphics commands are rerouted by the VFBD onto the PCI bus for processing by the graphics controller. In this manner, latency of graphics commands issued by the microprocessor is minimized and stalling of the microprocessor, as a result of the FIFO queue of the memory controller becoming full, is avoided.

In another alternative embodiment, the graphics controller is configured to perform only frame buffer refresh operations. All other graphics operations are performed by the microprocessor which routes the operations through the memory controller to the frame buffer portion of the shared memory.

Also as noted, in the exemplary embodiment, a single memory interface bus connects the memory controller and the graphics controller to the shared memory. Accordingly, the memory controller is prevented from accessing any portion of the shared memory while the graphics controller is performing an operation on the frame buffer, such as a frame buffer refresh operation. In another alternative embodiment, first and second separate portions of physical memory are provided. A first interface bus interconnects the memory controller to the first portion of memory. A second interface bus interconnects both the memory controller and the graphics controller to the second portion of memory. The frame buffer is defined within the second portion of memory. The second portion of memory also includes system memory as well. With this partitioning, the memory controller may access the first portion of memory while the graphics controller is accessing the second portion of memory, perhaps to perform a frame buffer refresh. Accordingly, access to only a portion of the system memory is prevented while the graphics controller is accessing the frame buffer. The memory controller may freely access the system memory contained within the first portion of the physical memory at all times. The memory controller may also access the system memory contained within the second portion of the physical memory at any time that the graphics controller is not busy performing an operation on the frame buffer.

Hence, the invention provides a method and apparatus for controlling and managing access to a shared computer system memory and disadvantages with such systems set forth above are substantially overcome. Other features and advantages of the invention would be apparent from the detailed description below in connection with the attached drawings.

DETAILED DESCRIPTION OF THE INVENTION

Referring to figures, exemplary embodiments of the invention will now be described. The exemplary embodiments are provided to illustrate aspects of the invention and should not be construed as limiting the scope of the invention. The exemplary embodiments are primarily described with reference to block diagrams and flowcharts. As to the flowcharts, each block within the flowcharts represents both a method step and an apparatus element for, or means for, or element for performing the method step. Depending upon the implementation, the corresponding apparatus element may be configured in hardware, software, firmware or combinations thereof.

Initially, an overview of an exemplary computer system incorporating the invention will be described with reference to FIGS. 1 and 2. Then, details of the operation of the exemplary computer system will be described with further reference to FIG. 1 and also with reference to FIGS. 3–4. Two alternative embodiments of the invention will then be described with reference to FIGS. 5 and 6.

Figure 1:
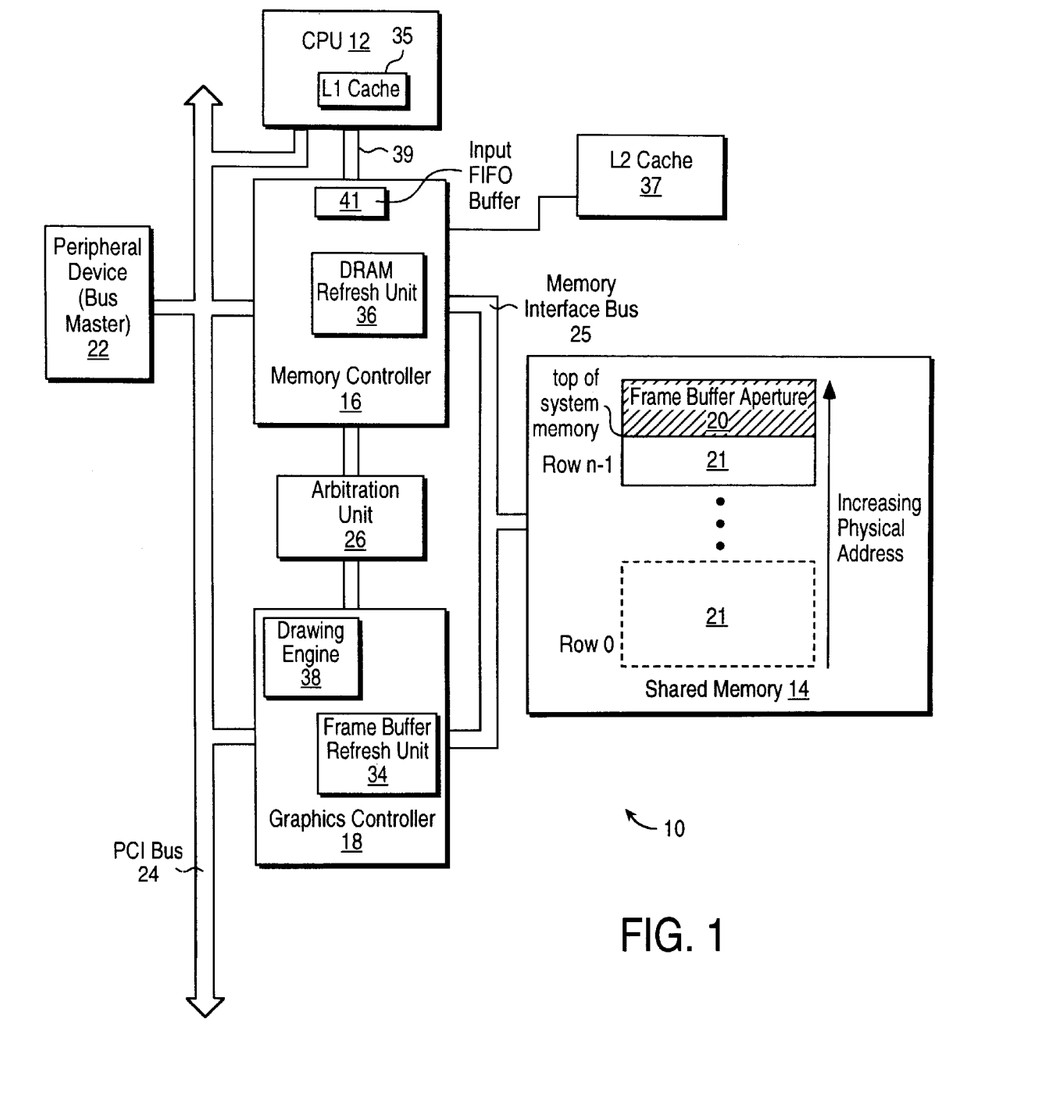
FIG. 1 is a block diagram illustrating a computer system configured in accordance with the invention and having a shared physical memory partitioned between system memory and frame buffer memory.

FIG. 1 illustrates a computer system 10 having, as its principal components, a CPU or microprocessor 12, a shared memory 14, a memory controller 16 and a graphics controller 18. CPU 12 is connected to memory controller 16 by a system bus 39. The CPU, memory controller and graphics controller are interconnected via a PCI bus 24. One or more peripheral devices, such as bus master peripheral device 22, are also connected to the PCI bus. CPU 12 includes an on-board L1 cache 35. An external L2 cache 37 is connected to memory controller 16. A portion of memory 14 is dedicated as a frame buffer 20. Remaining portions of memory 14 are dedicated as system memory 21. The memory controller accesses both the system memory portion and the frame buffer portion of shared memory 14 based upon commands or data received from the CPU 12, peripheral device 22 or any other "client" device. The graphics controller accesses only the frame buffer portion of the shared memory. Both the memory controller and the graphics controller access the shared memory through a single memory bus 25.

Figure 2:
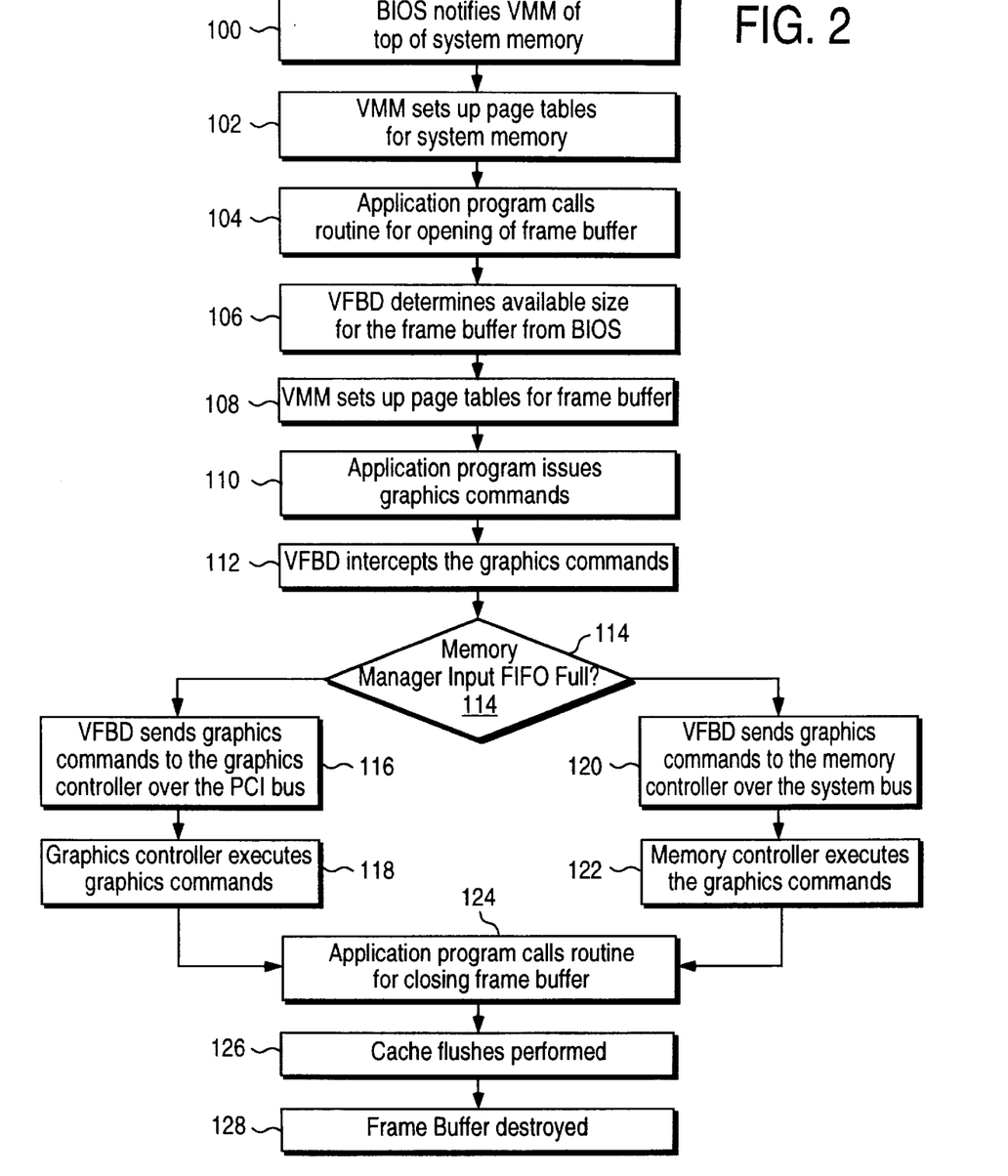
FIG. 2 is a flowchart illustrating a method by which access to the shared memory of FIG. 1 is performed.

The graphics controller accesses the frame buffer portion of system memory 14 to store graphics data therein for ultimate display on a graphics display (not shown in FIG. 2). Graphics data, or commands relevant thereto, are received through the PCI bus. The graphics commands may originate from, for example, the CPU or from any other bus master on the PCI bus. Graphics controller 18 includes a drawing engine 38 provided to facilitate execution of general graphics commands received over the PCI bus. For example, a general command related to 2D or 3D rendering or video decomposition may be received from the PCI bus. The drawing engine performs a sequence of specific operations which actually performed the requested operation. Graphics controller 18 also includes a frame buffer refresh unit 34.

Accesses to the shared memory may be in the form of commands, such as graphics commands, or data. Herein the term "operation" will be used to refer to any type of operation such as a command to be performed or to be transferred.

Hence, computer system 10 includes a memory accessible by both a memory controller and a graphics controller. An arbitration unit 26 is provided for coordinating access to the memory by the memory controller and the graphics controller. The arbitration unit receives usage requests from both the memory controller and the graphics controller and determines relative priority of the usage request, then grants access to one device or the other depending upon the relative priorities. In FIG. 1, the arbitration unit is shown as a separate component from the memory controller and the graphics controller. However, depending upon the implementation, the arbitration unit may form a portion of the memory controller.

The arbitration unit receives usage request information from the graphics controller and transmits grant information to the graphics controller in accordance with a two-wire signaling protocol described in detail in the above-referenced patent application. The arbitration unit also receives signals from, and transmit signals to, the memory controller. The arbitration unit and the method by which signals are transmitted between the arbitration unit and the graphics controller or between the arbitration unit and memory controller are known in the art and will not be described in further detail herein.

As noted, shared memory 14 is partitioned between system memory 21 and frame buffer 20. The frame buffer is defined as the highest memory address portions of the shared memory. In an exemplary system, wherein a total of eight megabytes of shared memory are provided, the frame buffer may reside within, for example, the top-most one megabyte of memory. The lower seven megabytes of memory are employed as system memory which may include, for example, paging tables and the like. At system start-up, a BIOS (not shown in FIG. 1) transmits a signal to CPU 12 identifying the top of system memory as being just below the lowest-most address of the frame buffer. In the example, the top of system memory is at seven megabytes. Hence, the operating system of the CPU is not aware of the existence of any memory beyond the top of system memory. The operating system is therefore not aware of the frame buffer portion of the shared memory. Accordingly, the operating system accesses only the system memory portion of the shared memory. If configured in accordance with Intel Architecture, at start-up the CPU defines page tables which relate the physical addresses of system memory 21 to virtual addresses. Initially, the page tables do not relate the physical addresses of frame buffer 20 to virtual addresses.

By defining the top of system memory as excluding the frame buffer memory, the operating system will not allow access to the frame buffer and will not swap data into the frame buffer. Therefore, corruption of graphics data stored within the frame buffer is avoided. However, application programs running on the CPU may nevertheless access the frame buffer by generating graphics operations. The graphics operations generated by the application programs running on the CPU are intercepted by a virtual frame buffer device (VFBD) running on the CPU. The VFBD routes all such operations through system bus 39 to memory controller 16 which in turn accesses frame buffer 20. If an input FIFO buffer 41 of the memory controller is full, the graphics operation issued by CPU 12 are rerouted onto PCI bus 24 for execution by the graphics controller.

All operations accessing frame buffer 20 provided along PCI bus 24 are processed through graphics controller 18. This may include graphics operations issued by any bus master on the PCI bus including graphics operations issued by the CPU and rerouted onto the PCI bus as a result of input buffer 41 of the memory controller being full. To ensure that all such operations are processed by the graphics controller and not by the memory controller, the memory controller is configured to ignore any operations accessing memory addresses within the frame buffer.

As noted, computer system 10 includes an L1 cache and an L2 cache. In the exemplary system, data contained within the frame buffer is not cached within the L1 cache. Otherwise, the graphics controller would be required to perform a snoop operation on the L1 cache prior to performing any operation on the frame buffer. Data from the frame buffer, however, is cached within the L2 cache to expedite the processing of graphics commands issued by the CPU. A cache protocol, described below, is provided to ensure cache coherency among the L1 cache, the L2 cache and the frame buffer. The cache protocol, in part, ensures that a snoop of the L2 cache is also not required.

Steps performed by the computer system to control access to the frame buffer are summarized in the flowchart of FIG. 2. Initially, the BIOS transmits an indication of the top of system memory to the VMM, step 100, which defines page tables for a system memory, step 102. An application program requiring access to a frame buffer calls a software routine for opening a frame buffer, step 104. The BIOS transmits a value indicating the top of the frame buffer memory to the VFBD, step 106, which controls the VMM to create page tables for the frame buffer, step 108. Application software running on the CPU then generates graphics operations for accessing the frame buffer, step 110. The graphics operations are intercepted by the VFBD driver, step 112.

A determination is made by the VFBD through knowledge of the amount of data transferred as to whether the input buffer of the memory controller is full, step 114. If the input buffer of the memory controller is full, the graphics operations are forwarded by the VFBD to the PCI bus, step 116 and executed by the graphics controller, step 118. In some circumstances, the graphics operations may be performed directly on the frame buffer without requiring processing by the graphics controller. If the input buffer of the memory controller is not full, then graphics operations are transmitted through the system bus to the memory controller, step 120 then executed by the memory controller, step 122. Once all graphics operations have been executed and the frame buffer is no longer required, the application program calls an "end access" command, step 124, which causes the appropriate caches to be flushed. Subsequent accesses to the frame buffer may be performed. Each set of graphics operations is concluded by calling the "end access" command. Eventually, when no further accesses are required, the application program calls a destroy frame buffer command, step 126, which allows memory used connection with the frame buffer, such as page table memory, to be employed as system memory. The frame buffer memory itself, memory portion 20 of FIG. 1, however, cannot be used as system memory since the operating system does not recognize any memory space above the top of system memory.

Details of a particular implementation of the computer system of FIGS. 1 and 2 will now be described with reference to FIGS. 3 and 4.

Figure 3:
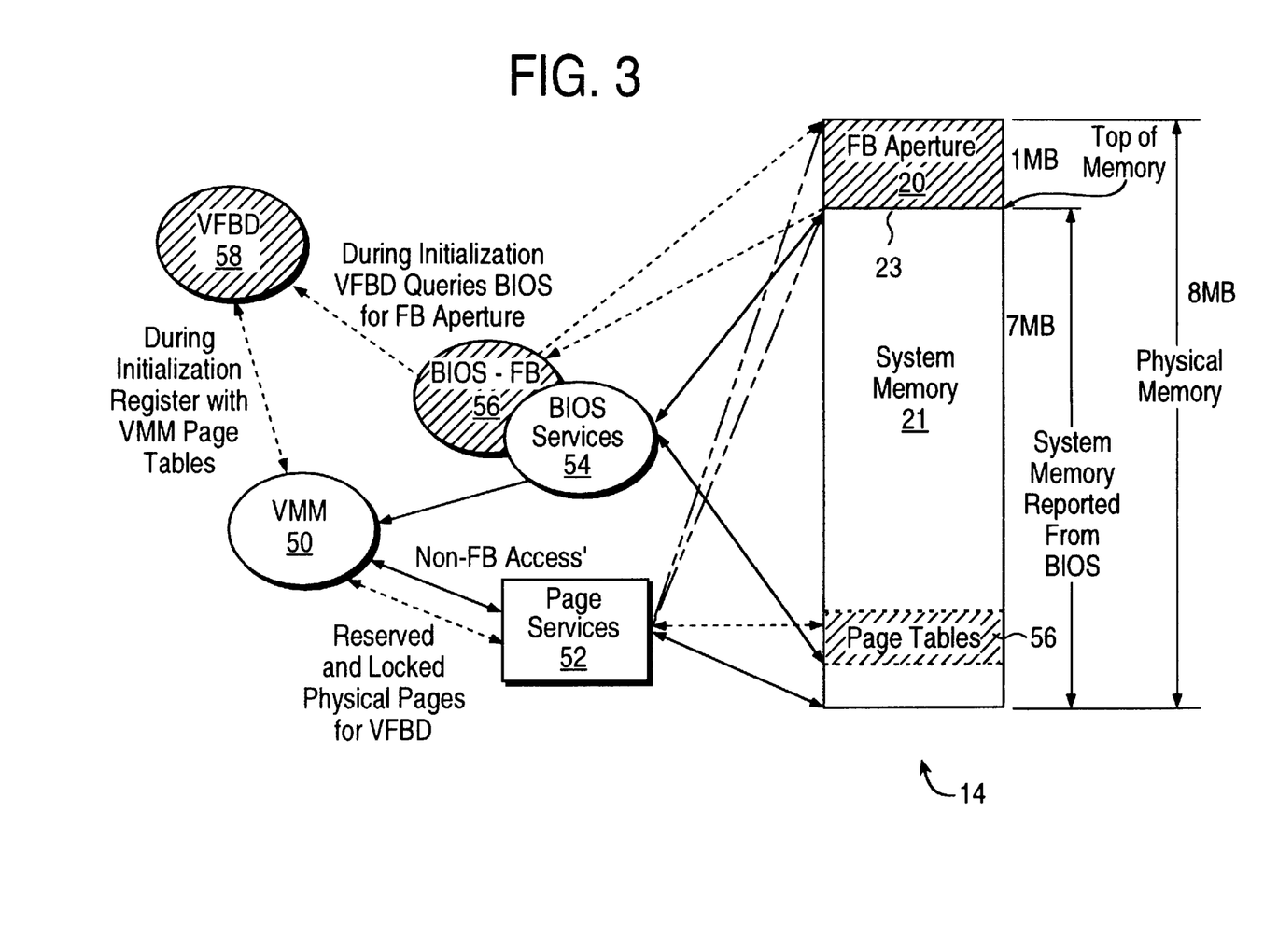
FIG. 3 is a block diagram primarily illustrating software employed within the system of FIG. 1.

FIG. 3 illustrates hardware and software components operating during system initialization to coordinate partitioning of the shared memory. Software components include a virtual memory manager 50, a page services unit 52 and a BIOS services unit 54. At boot-up, BIOS services unit 54 is configured to notify VMM 50 that the top of system memory is memory address 23 which is just below memory devoted to the frame buffer. VMM 50 defines a set of page tables 56 relating physical address up to top of system memory 23 to virtual addresses. VMM 50, page services unit 52 and BIOS services unit 54 may be generally conventional software devices.

FIG. 3 also illustrates a BIOS frame buffer unit 56 and an VFBD 58. As noted above, the VFBD operates as an interface between applications programs and the memory controller. More specifically, the VFBD is specific to the memory controller hardware and represents the hardware specific content in software for the frame buffer. The VFBD is the service provider for all frame buffer accesses from software. During initialization of a frame buffer, the VFBD queries the BIOS frame buffer unit 56 to determine the size of frame buffer 20. Then, the VFBD communicates with the VMM to control the VMM to set up additional page tables relating the physical addresses of the frame buffer to virtual memory addresses. The pages associated with the frame buffer are distinct from those associated with system memory. This is achieved by defining a unique memory type for the addresses of the frame buffer which is distinct from any of the memory types associated with addresses of system memory. Hence, pages are registered by the VMM for use by the VFBD. In one embodiment, the pages are reserved and locked pages. The pages are allocated for the exclusive use of the VFBD and hence cannot be accessed by any other device drivers nor by operating system software.

Figure 4:
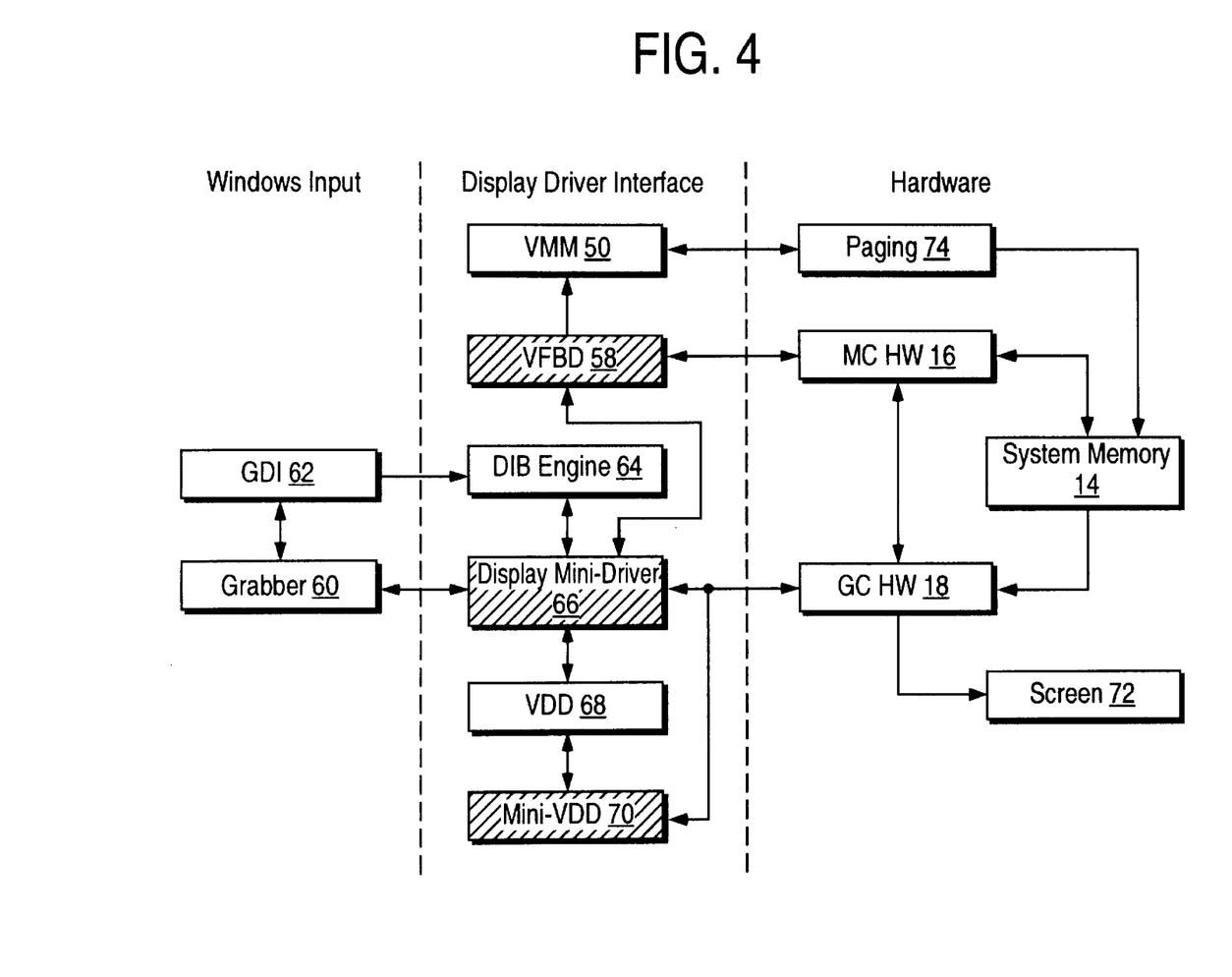
FIG. 4 illustrating selected portions of the software of FIG. 3 and the computer system memory of FIG. 1, employed during software initialization of the frame buffer.

FIG. 4 illustrates selected hardware components from FIG. 1 along with software components either operating as graphics input devices or as display interface devices. More specifically, FIG. 4 illustrates a frame grabber 60 and a graphics display interface (GDI) 62 which may form part of a Windows® environment. Windows® is a registered trademark of Microsoft Corporation. The display driver interface of FIG. 4 includes the aforementioned VMM 50 and VFBD 58. The display driver interface also includes a display interface block transfer (DIB) engine 64, a display mini-driver 66, a virtual device driver (VDD) 68 and a mini-VDD 70, interconnected as shown. As hardware components, FIG. 4 illustrates memory controller 16, graphics controller 18, shared memory 14, a display screen 72 and a hardware paging unit 74.

Within the display driver interface, the display mini-driver and the mini-VDD are specific to the graphics controller and represent the hardware specific content in software for the overall graphics controller system. Other components illustrated in FIG. 4, such as the GDI, the DIB engine, the frame grabber and the VDD perform otherwise conventional services and hence will not be described in detail herein.

The following software arbitration protocol is employed by the various software entities of FIG. 4 to ensure that data contained within the frame buffer portion of shared memory 14 is not corrupted.

The VFBD is the owner of all software access to the frame buffer aperture.

The MC shall be notified by VFBD when access to the aperture region is taking place.

The MC shall acknowledge to VFBD that frame buffer access is granted.

The VFBD shall notify the MC when frame buffer access has ceased.

As noted above, an arbitration unit employing a two-wire protocol is employed to determine whether the frame buffer aperture is busy. As an alternative, a register within the MC may be used for busy state of the FB aperture. This register may be used to indicate if the CPU has access to the FB. The GC queries this register to determine busy state of a CPU access. Additionally, a register within the GC contains a bit to indicate busy.

With this configuration, access to a frame buffer may be performed as follows:

The client software (i.e., graphics device drivers, DCI, GDI, etc.) request access to the frame buffer through the VFBD provider through a call to VFBD Initialize-FrameBuffer.

The VFBD provider queries the MC to gain access to the physical frame buffer aperture, allocates the VFBD data structures and returns access to the frame buffer to the client.

The client informs VFBD when access to the frame buffer will occur through a call to a VFBDBeginAccess routine, allowing the client exclusive access to the aperture.

The client informs VFBD when access to the frame buffer ceases through a call to a VFBDEndAccess routine, allowing the GC access to the aperture.

The client informs VFBD when the frame buffer is no longer needed through a call to a VFBDDestroyFrame-Buffer routine.

During periods of non-access by a client to the frame buffer aperture, the MC will forward any access to the region of memory to PCI.

During period of access by a client to the frame buffer aperture, the MC will NOT pass any access to the region of memory to PCI.

In the foregoing, certain frame buffer operations, such as initiating a frame buffer and closing a frame buffer, are described with reference to specific software routines accessed to perform the stated operation. Examples include VFBDBeginAccess and VFBDEndAccess. The software routine names are, of course, completely arbitrary. Further details regarding exemplary software routines for performing the stated functions are set forth in Appendix A attached hereto.

As noted above, the computer system includes both L1 and L2 caches. To maintain coherency, the following protocol is employed. The frame buffer aperture is mapped into the paging tables of the Intel Architecture CPU via InitializeFrameBuffer. The page tables mapping the linear to physical memory can either be cached or not cached in both L1 (CPU resident) and L2 (MC resident) or not in L1 but in L2 (the case when page caching is disabled yet caching is enabled). To maintain coherency between CPU modified memory of the frame buffer aperture (located in cache) and the physical aperture (located in physical memory) an update protocol exists between VFBDBeginAccess, VFBDEndAccess and the 2 (L1 and L2) caches within the system.

The update protocol is summarized in Table 1.

TABLE 1

| L1/L2 Cache Scheme | CPU | MC | Triton VX |
| --- | --- | --- | --- |
| WT/WT | None | None | Flush |
| WT/WB | None | Flush | Flush |
| WB/WB | WBINVD | Flush | Flush |
| WB/WT | WBINVD | None | Flush |

Table 1 shows the update (flush strategy) necessary to maintain coherency between the frame buffer and VFBD. The L1 and L2 cache scheme states are shown on each row of the table. The CPU column notes what action the CPU must take. WBINVD, is an Intel Architecture instruction that is executed within the VFBDEndAccess function based upon caching scheme enabled. The WBINVD instruction performs a write back invalidate flush operation. Of course, in other implementations, other specific instructions will be called. The MC column notes what action takes place on the L2 cache of the memory controller. In one particular implementation, rather than employing a memory controller chip, a Triton VX system controller chip is employed which includes memory controller functionality. The Triton VX system controller chip is provided by Intel Corporation. The Triton VX column refers to what action on L2 is needed with a Triton VX MC. The Triton VX's L2 always needs flushing as the cache scheme is always WB.

In an Intel Architecture implementation, flushing of L1, is accomplished by executing a WBINVD Intel Architecture instruction on the CPU. However, flushing of L2 is accomplished through the following algorithm:

```
Algorithm 1: L2 Cache Flush Strategy:

L2_Flush( ) {
    //
    // Flush the L1 cache (if necessary)
    //
    WBINVD
    //
    // Set MC cache invalidate bit
    //
    CINVD[0:0]=TRUE;
    //
    // Read each line of FB contained in L2
    I=0;
    while (I<FB_SIZE) {
        temp=fb[I];
        I=I+32;
    }
    //
    // Set MC cache invalidate bit FALSE
    //
    CINVD[0:0]=FALSE;
}
```

The Triton VX MC contains a hardware circuit that, when activated, flushes the L2 cache without the need to use Algorithm1: L2 Cache Flush Strategy. This circuit, when enabled, performs the following algorithm:

Algorithm 2: Triton VX Cache Flush FB

```
L2FlushFB( ) {
    for each cache_line do {
        if Top_System_Memory<current_cache_line[addr]
        <+Top_System_memory+FB_SIZE then
        invalidate_cache_line
        write_back cache line to FB aperture
        ]
    }
]
```

VFBD uses Algorithm 3: VFBD Triton Based L2 Cache Flush, when a Triton VX MC is existent within the system. This improves performance over Algorithm 1: L2 Cache Flush Strategy, by use of non-CPU cycles to cause a cache flush.

Algorithm 3: VFBD Triton Based L2 Cache Flush

```
TVXL2_Flush( ) {
    //
    // flush the L1 cache (if necessary)
    //
    WBINVD
    //
    // Toggle the Triton VX cache invalidate frame buffer bit
    //
    CINVD_FB[0:0]=TRUE;
    CINVD_FB[0:0]=FALSE;
}
```

Figure 5:
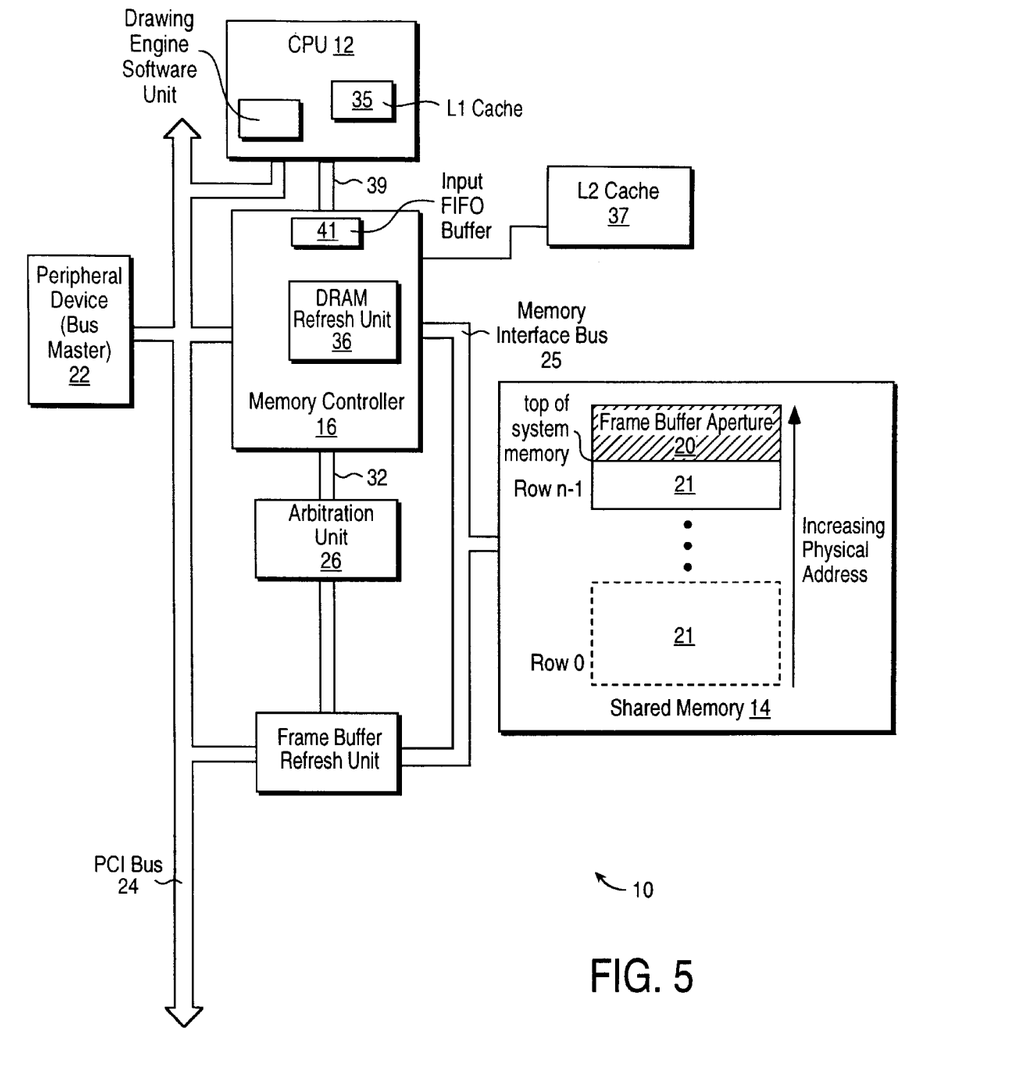
FIG. 5 is a block diagram illustrating a computer system configured in accordance with an alternative embodiment of the invention wherein substantially all graphics commands are generated by a microprocessor.

Alternative exemplary embodiments of the invention will now be described with reference to the remaining figures. FIG. 5 illustrates an alternative computer system 200 similar to the system of FIG. 1 but wherein substantially all graphics operations are performed by the CPU. Accordingly, no graphics controller is provided. Rather, the graphics controller is replaced with a unit which performs only frame buffer refresh operations. Operations otherwise performed by the drawing engine of the graphics controller of FIG. 1 are performed by software running on the CPU. Accordingly, in FIG. 2, the CPU is shown as including a drawing engine software package 238. The drawing engine software of the CPU may utilize conventional rendering packages such as 3DR by API software or Open Graphics Language (OpenGL), a standard graphics software library.

The system of FIG. 5 operates in much the same manner as the system of FIG. 1 and therefore will not be described in detail. However, it is noted that, because no separate graphics controller is provided, graphics operations issued by the CPU are never redirected onto the PCI bus while a frame buffer is in use. Rather, all such operations are routed through the memory controller. If no frame buffer is defined, then all operations accessing the frame buffer portion of memory are transmitted onto the PCI bus, as discussed above. Preferably, the memory controller and its associated input FIFO are configured to be sufficiently fast to handle all such commands to prevent any stalling of the CPU. Also, preferably, the CPU is sufficiently fast and powerful to handle all graphics operations as fast or faster than a conventional graphics controller. One suitable microprocessor is the Pentium microprocessor provided by Intel Corporation. Pentium and Intel are both registered trademarks of Intel Corporation.

Figure 6:
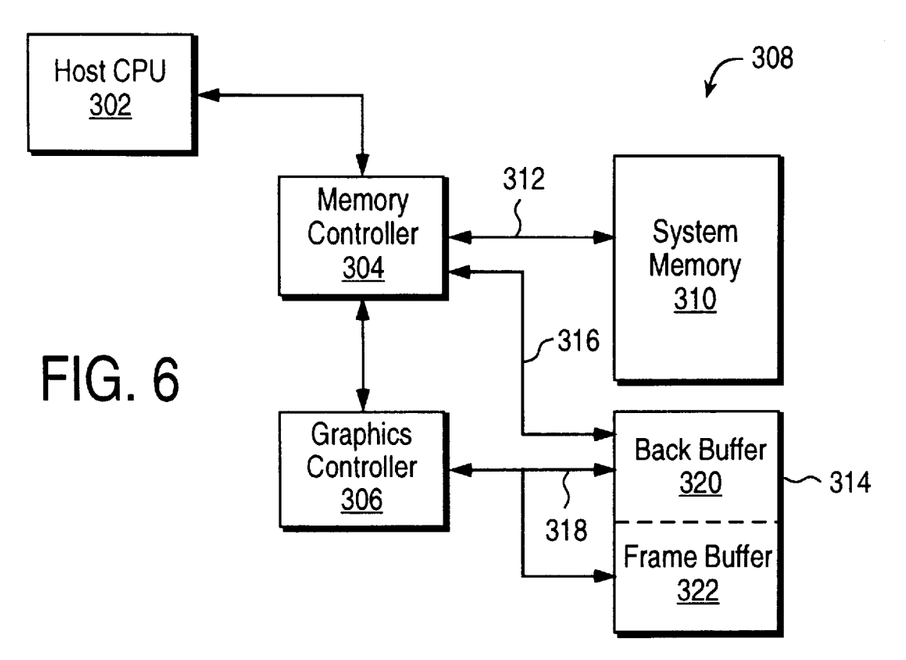
FIG. 6 is a block diagram illustrating an alternative arrangement for partitioning the shared computer system memory.

FIG. 6 illustrates a computer system employing an alternative partitioning scheme for partitioning physical memory into system memory and frame buffer memory. More specifically, alternative computer system 300 is illustrated which includes a host CPU 302, a memory controller 304, a graphics controller 306 and a physical memory array 308. Physical memory 308 includes a first portion 310 connected by an interface bus 312 to only the memory controller. Physical memory 308 also includes a second portion 314 connected by an interface bus 316 to the memory controller and to the graphics controller. Memory space provided within memory portions 314 is divided between a system memory back buffer 320 and a frame buffer 322.

Hence, unlike the system of FIG. 1, wherein the entire physical memory array is accessible to only a single interface bus by both the memory controller and the graphics controller, the physical array of the system of FIG. 6 is accessible through two separate buses. The memory controller has access through both buses to both portions of memory. The graphics controller has access through only one of the buses to the second portion of memory. Accordingly, while the graphics controller is accessing the frame buffer, perhaps to perform a frame buffer refresh operation, the memory controller may freely access system memory 310. When the graphics controller is not accessing the frame buffer, the memory controller may also access back buffer 314 which represents additional system memory. In this manner, frame buffer operations performed by the graphics controller do not necessarily delay system memory accesses by the memory controller, yet other advantages of the invention are achieved.

What has been described are several exemplary embodiments of a computer system having a shared memory and employing various methods and apparatus for controlling or managing access to the shared memory. In one embodiment, the computer system employs a CPU configured in accordance with Intel Architecture, perhaps an Intel Pentium microprocessor. However, principles of the invention may be applied in computer systems employing other microprocessor architectures as well. Also in an exemplary embodiment, the memory controller is a Triton VX system controller provided by Intel Corporation. Again, however, principles of the invention may be applied to systems employing a wide range of other memory controllers.

A variety of hardware and software functions have been described herein. Depending upon the implementation, many of the hardware functions may be emulated using software. Likewise, software functions may be performed using hardware components having hardwired circuitry configured to perform the functions. In other implementations, some of the hardware or software functions may be configured using firmware or other computer system implementation technologies.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A memory control system comprising:

a shared memory divided into a first portion and a second portion;

an element for selectively defining a part of the second portion of the memory as a frame buffer;

a graphics controller for accessing the second portion of the shared memory;

a memory controller for processing graphics operations; and an element for intercepting graphics operations and routing the graphics operations through the memory controller if the frame buffer is defined, and routing the graphics operations through the graphics controller if the frame buffer is not defined.

2. The memory control system of claim 1 further comprising:

a first bus for coupling the memory controller to the first and second portions of the shared memory; and a second bus for coupling the graphics controller to the second portion of the shared memory.

3. The memory control system of claim 1 further comprising:

a single system bus for coupling the graphics controller and the memory controller to the shared memory.

4. The memory control system of claim 1 wherein:

the graphics controller is designed to perform only frame buffer refresh operations; and the memory controller is designed to perform other graphics operations.

5. The memory control system of claim 1 further comprising:

an input buffer coupled to the memory controller; and an element for determining if the input buffer is full and routing the graphics operations through the graphics controller if the input buffer is full.

6. In a computer system having a shared memory divided into a first and second portion, a memory controller, and a graphics controller, a method comprising the steps of:

selectively defining a part of the second portion of the shared memory as a frame buffer;

routing the graphics operations to the second portion of the shared memory through the graphics controller if the frame buffer is not defined; and routing graphics operations to the second portion of the shared memory through the memory controller, if the frame buffer is defined.

7. The method of claim 6 further comprising the steps of:

performing only frame buffer refresh operations on the second portion of the shared memory using the graphics controller; and performing other graphics operations using the memory controller.

8. The method of claim 6 further comprising the steps of:

intercepting the graphics operations using a virtual frame buffer device (VFBD), the VFBD routing the graphics operations to the graphics controller and the memory controller.

9. The method of claim 6 further comprising the steps of:

routing the graphics operations through an input buffer associated with the memory controller, if the frame buffer is defined;

determining if the input buffer is full; and routing graphics operations through the graphics controller if the input buffer is full.

10. A memory control system comprising:

a processor;

a memory controller;

a graphics controller;

a shared memory, accessible by the memory controller and the graphics controller;

the processor for selectively defining a portion of the shared memory as a frame buffer; and a virtual frame buffer device (VFBD) for intercepting graphics operations and routing the graphics operations through the memory controller if the frame buffer is defined and through the graphics controller if the frame buffer is not defined.

11. A memory control system of claim 10 further comprising:

an input buffer; and an element for determining if the input buffer is full and routing graphics operations through the graphics controller if the input buffer is full.

12. The memory control system of claim 10 wherein:

the graphics controller only performs frame buffer refresh operations; and the memory controller performs other graphics operations.

13. The memory control system of claim 10 further comprising:

a first bus for coupling the memory controller to the first and the second portions of the shared memory; and a second bus for coupling the graphics controller to the second portion of the shared memory.

14. The memory control system of claim 10 further comprising:

a system bus for coupling the graphics controller and the memory controller to the shared memory.

15. In a memory control system having a shared memory accessible by a memory controller and a graphics controller, an improvement comprising configuring the computer system to:

selectively define a portion of the shared memory as a frame buffer;

route graphics operations provided by a client device through the memory controller if a frame buffer is defined; and route the graphics operations through the graphics controller if no frame buffer is defined.

16. The improvement of claim 15 further comprising configuring the computer to:

route graphics operations through an input buffer associated with the memory controller;

determine if the input buffer is full; and route graphics operations through the graphics controller if the input buffer is full.

17. The improvement of claim 15 further comprising configuring the computer to:

perform only frame buffer refresh operations using the graphics controller; and perform other graphics operations using the memory controller.

* * * * *